J. J. KINZER, Jr.

BRAKE SHOE CONNECTION.

No. 11,636. Reissued Nov. 9, 1897.

WITNESSES:

Chas. F. Miller.

Wm. H. Erskine.

INVENTOR,

John J. Kinzer Jr by Damon S. Wolcott

Att'y.

THE NORRIS PETERS CO., WASHINGTON, D. C.

UNITED STATES PATENT OFFICE.

JOHN J. KINZER, JR., OF PITTSBURG, PENNSYLVANIA, ASSIGNOR TO THE KINZER & JONES MANUFACTURING COMPANY, OF SAME PLACE.

BRAKE-SHOE CONNECTION.

SPECIFICATION forming part of Reissued Letters Patent No. 11,636, dated November 9, 1897.

Original No. 565,004, dated August 4, 1896. Application for reissue filed July 6, 1897. Serial No. 643,684.

*To all whom it may concern:*

Be it known that I, JOHN J. KINZER, Jr., a citizen of the United States, residing at Pittsburg, in the county of Allegheny and State of Pennsylvania, have invented or discovered certain new and useful Improvements in Brake-Shoe Connections, of which improvements the following is a specification.

The invention described herein relates to certain improvements in means for attaching brake-shoes to the brake-beam and in supporting the shoes and beam from the truck; and the invention has for its object such a construction of these connections as will permit of a yielding application of the shoe to the wheel.

The invention is hereinafter more fully described and particularly claimed.

Figure 1:
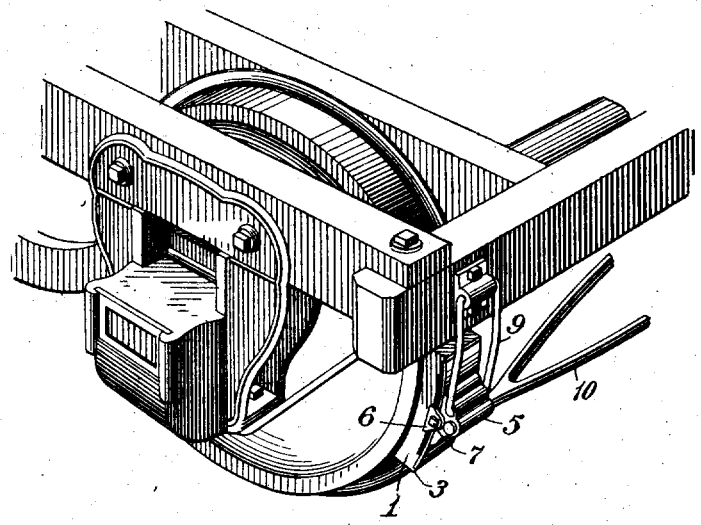
Figure 2:
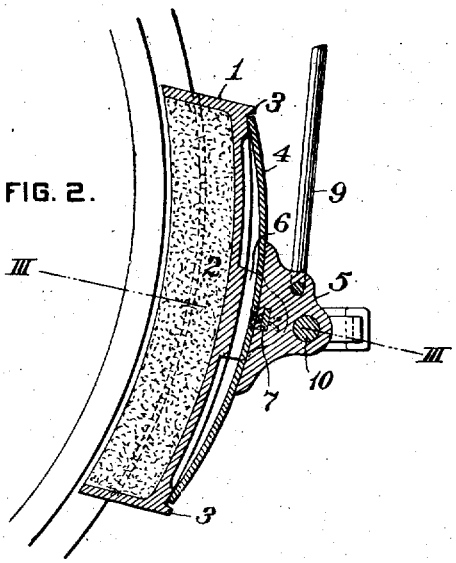
Figure 3:
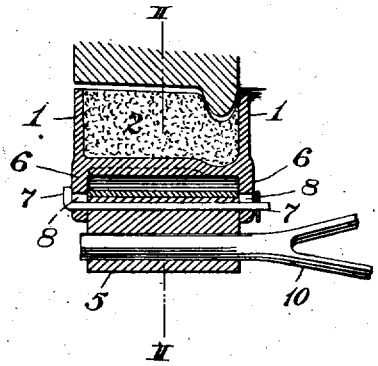

In the accompanying drawings, forming a part of this specification, Figure 1 is a perspective view of a portion of a car-truck having my improvement applied thereto. Fig. 2 is a vertical section of the shoe and connection, the plane of section being indicated by the line II II, Fig. 3. Fig. 3 is a transverse section of the same, the plane of section being indicated by the line III III, Fig. 2.

While I have shown my improvement in connection with a "composite shoe" consisting of a shell 1 and a filling 2 of any suitable material, my invention is equally applicable to solid shoes. The shoe is detachably connected to a block, which is provided with means whereby the brake-beam and hanger may be connected thereto. In order to prevent the locking of the wheels by a quick and severe application of the brakes, a spring is interposed between the shoe or shoe-carrier and the block, which in such case is movably as well as detachably connected to the shoe or carrier, as hereinafter more particularly described.

It is preferred to employ a leaf-spring between the block and shoe or carrier, as such form of spring will be less liable to injury in use, and hence my improvement is shown in connection with such a form of spring, although it is not limited thereto.

On the back of the shell or shoe are formed shoulders or transverse ribs 3, and between these ribs or shoulders I arrange a concavo-convex spring 4, somewhat shorter than the distance between the ribs, so as to permit of a flattening of the spring when pressure is applied thereto. The spring is held in place by a block 5, arranged between ears or lugs 6. The block is held in position by means of a pin 7, passing through a hole in the block and slots 8 in the ears or lugs. The slots in the lugs are so located that the spring 3 must be slightly compressed in order to bring the hole in the block in line with the slots for the insertion of the connecting-pin 7, so that normally the pin is pressed against the outer ends of the slots by the spring, which in turn is so held by the block that its ends cannot be lifted over the ribs or shoulders 3.

The block is preferably provided with holes, one for the reception of the hanger-link 9 and the other for the reception of the end of the brake-beam 10, although the link and beam may be attached to the block in any other suitable manner.

It will be readily understood by those skilled in the art that a shoe can be easily and quickly removed and a new shoe inserted without disturbing the connections with the truck and brake-beam, as it is only necessary to knock out the pin 7, thereby releasing the shoe. When the new shoe has been placed in position, pressure applied to the block or brake-beam will bring the holes in the block into register with the slots in the ears or lugs, so as to permit of the insertion of the pins 7.

The spring being placed between the shoe and brake-beam insures a steady and even application of the shoe to the wheel, as if a sudden and severe pressure is applied, as in an emergency application of the brakes, the spring will yield and prevent a locking of the wheels and so insure the most effective application of the brakes.

I claim herein as my invention—

1. The combination of a brake-shoe or brake-shoe carrier, a block movably connected to the shoe or carrier and provided with means for attachment to the brake-beam and hanger and a spring interposed between the block and shoe or carrier, substantially as set forth.

2. The combination of a brake-shoe or brake-shoe carrier provided with shoulders or ribs, a block movably and detachably connected to the shoe or carrier and provided with means for connection to the brake-beam and hanger, and a spring interposed between the block and shoe or hanger and between the ribs or shoulders on the shoe or carrier, substantially as set forth.

3. A brake-shoe or brake-shoe carrier provided at its ends with bearing-shoulders and with slotted lugs intermediate of the bearing-shoulders, whereby the shoe or shoe-carrier may be connected with a freedom of movement to the brake-beam or brake-beam connection substantially as set forth.

In testimony whereof I have hereunto set my hand.

JOHN J. KINZER, JR.

Witnesses:
DARWIN S. WOLCOTT,
F. E. GAITHER.